May 24, 1932.  J. E. LEDERMAN  1,859,302
DISHWASHING MACHINE CASING
Original Filed July 9, 1928

Inventor
John E. Lederman
By
Charles & French
Attorneys

Patented May 24, 1932

1,859,302

UNITED STATES PATENT OFFICE

JOHN E. LEDERMAN, OF MILWAUKEE, WISCONSIN, ASSIGNOR TO HYDRO ELECTRIC MANUFACTURING COMPANY, OF MILWAUKEE, WISCONSIN, A CORPORATION OF WISCONSIN

DISHWASHING MACHINE CASING

Original application filed July 9, 1928, Serial No. 291,197. Divided and this application filed January 20, 1930. Serial No. 422,094.

The invention relates to dishwashing machines and more particularly to the cabinet or casing structure of such machines.

One of the objects of this invention is to provide certain improvements in the cabinet or casing of the dishwashing machine whereby a good joint is assured between the cover and the body of the cabinet or casing and any water collecting in parts forming the joint will readily drain back into the machine.

A further object of the invention is to provide improvements in the delivery end of the casing whereby the basket containing the dishes may be readily removed from the machine.

This application is a division of my copending application Serial No. 291,197, filed July 9, 1928, for dishwashing machine.

The invention further consists in the several features hereinafter set forth and more particularly defined by claim at the conclusion hereof.

In the drawings Fig. 1 is a vertical, sectional view through a cabinet embodying the invention, parts being broken away;

Figure 1:
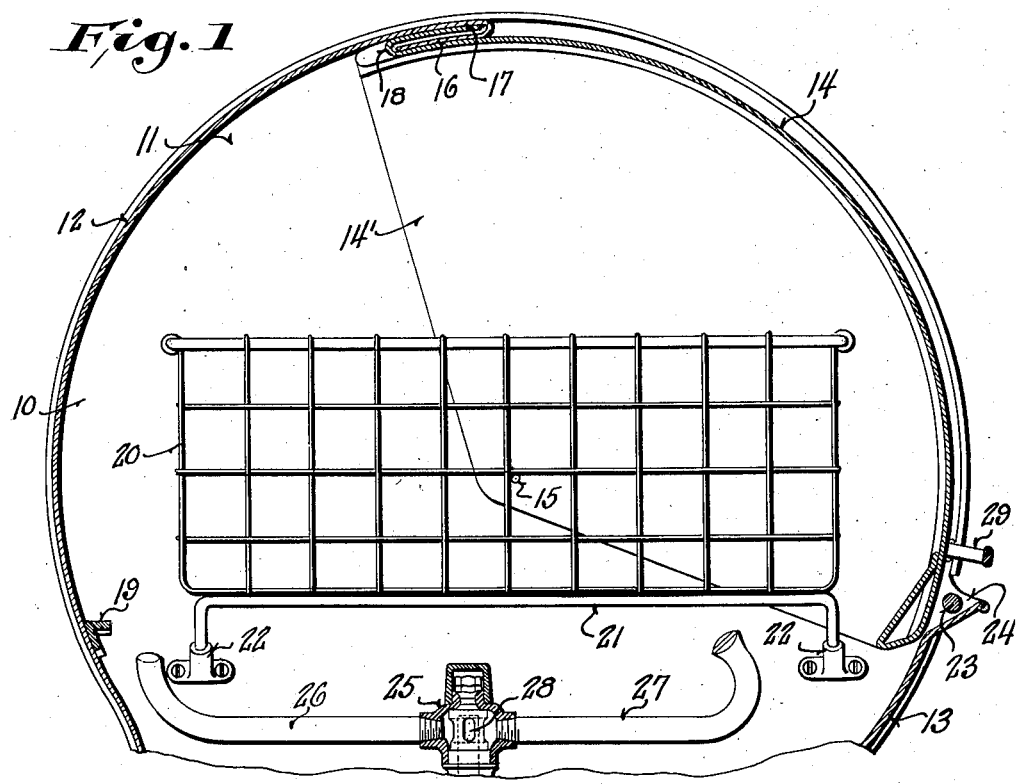

Referring to the drawings the numeral 10 designates the cabinet or casing which provides side walls 11, a curved rear wall 12 and a short front wall 13, thereby providing a large opening from the upper end of the wall 12 to the wall 13 which is normally closed by a curved cover 14 whose sides are pivoted at 15 to the side walls of the main casing 10, said casing and cover being formed of sheet metal or other suitable material.

Figure 2:
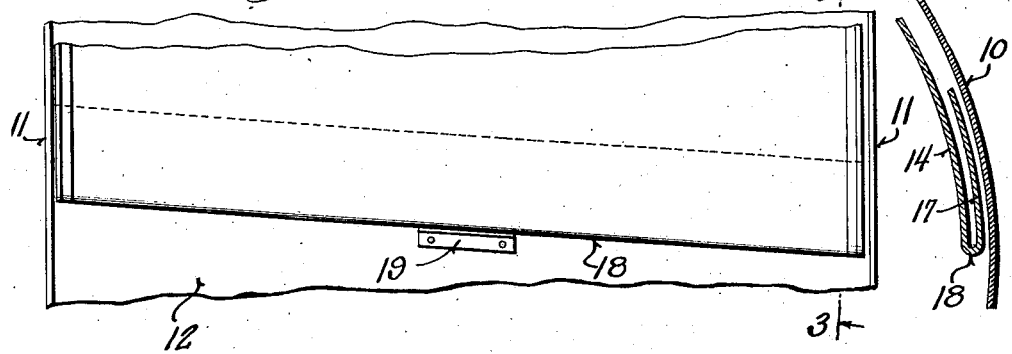
Fig. 2 is a detail view, looking into the machine with the cover in open position.
Figure 3:
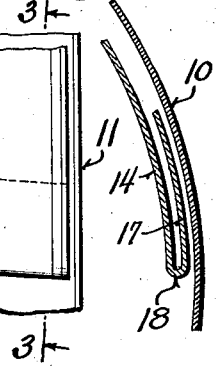
Fig. 3 is a detail, sectional view taken on the line 3—3 of Fig. 2.

The upper end of the rear wall 12 has an inturned flange 16 and the end 17 of the cover is formed into an out-turned, flanged edge that interlocks with the flange 16, as shown in Fig. 1, and thus provides a seal against the escape of water from the casing. In order to insure the release of any water that may get into the parts of this joint, the bent edge 18 of the flanged edge 17 of the cover inclines downwardly from one side of the machine to the other, as best shown in Figs. 2 and 3, so that any water getting into this space will readily drain therefrom back into the machine when the cover is in open position in which it engages the stop 19.

The dish basket 20 is supported in the machine upon spaced rods 21, one of which is shown. Each rod 21 is secured by brackets 22 to one side of the casing 10 and the basket in being removed from the machine rides over a wooden or non-metallic roller 23 which is disposed adjacent a trough 24 formed as a part of the front wall 13.

A rotatable spray head 25 may be of any suitable construction and by way of illustration I have shown a spray head in which water is discharged upwardly through a nozzle opening in the end of an arm 26 and is discharged laterally against the dishes through a nozzle opening in the end of an arm 27, these openings being at such an angle as to cause the spray head to rotate under the action of the passage of water through it, said spray head being mounted for rotation on a discharge conduit 28 which connects with a suitable source of pressure supply, such as shown in the aforementioned application, Serial No. 291,197, or with any suitable source of supply.

It will be noted from the drawings that the walls 11 are parallel to each other and that the side walls 14' of the cover 14 are also parallel to each other and move within the side walls 11.

While the cover 14 is in an open position dishes previously stacked in the basket are pushed into the machine on the supports or rods 21 assisted by the roller 23. The cover is then turned back to the closed position shown in Fig. 1. The water supply is then turned on and the rotation of the spray head 25 directs the water against the dishes in the basket, against the casing and thence upon the dishes in the basket and thoroughly washes the same.

Should any water get into the space between the joint formed by the upper end of the casing and the cover during the washing operation, it will readily drain back into the machine when the cover is in open position, as previously noted. The cover is manipulated by a laterally extending handle 29.

I desire it to be understood that this invention is not to be limited to any specific form or arrangement of parts except insofar as such limitations are included in the claim.

What I claim as my invention is:

In a dishwashing machine, the combination of a casing having parallel side walls and curved rear and front wall portions spaced apart to form a large opening, a cover having a curved wall and having side wall portions parallelly disposed, said side wall portions being pivotally mounted on the side walls of the casing, the upper end of the rear wall and the adjacent end of the cover having interlocking flanges forming a joint to seal the casing when the cover is closed, the flange on said cover being inclined downwardly from one side of the machine to the other so that any water getting into the space between the joint will readily drain therefrom back into the machine when the cover is in open position.

In testimony whereof I affix my signature.

JOHN E. LEDERMAN.